Oct. 9, 1945.  P. G. PEIK  2,386,502
SOUND DEADENER
Filed Oct. 15, 1942
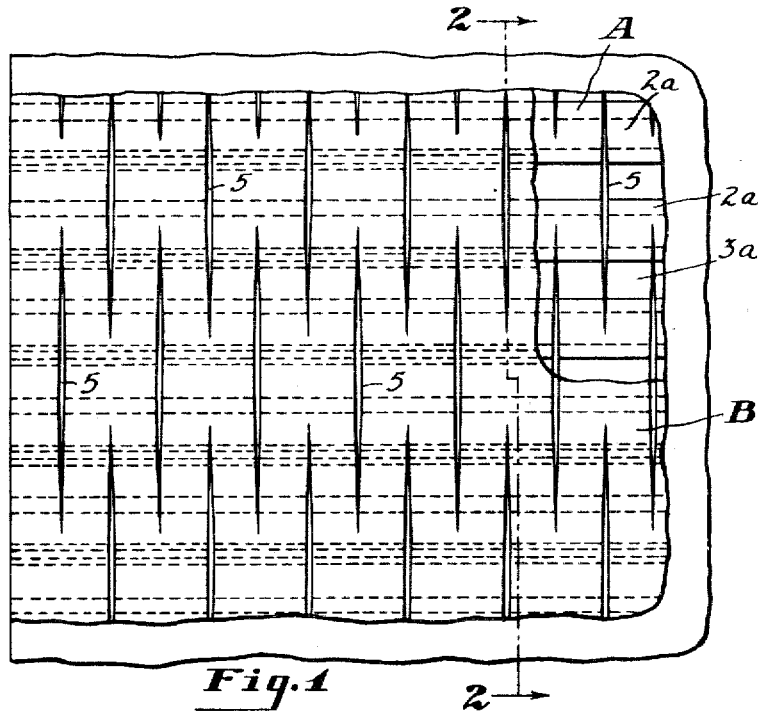
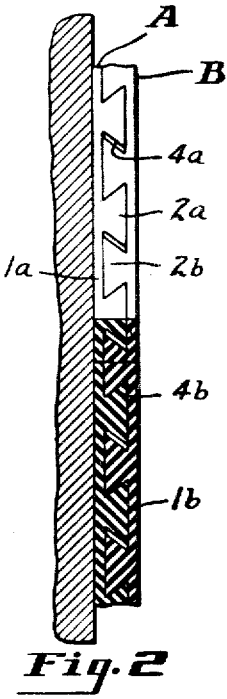
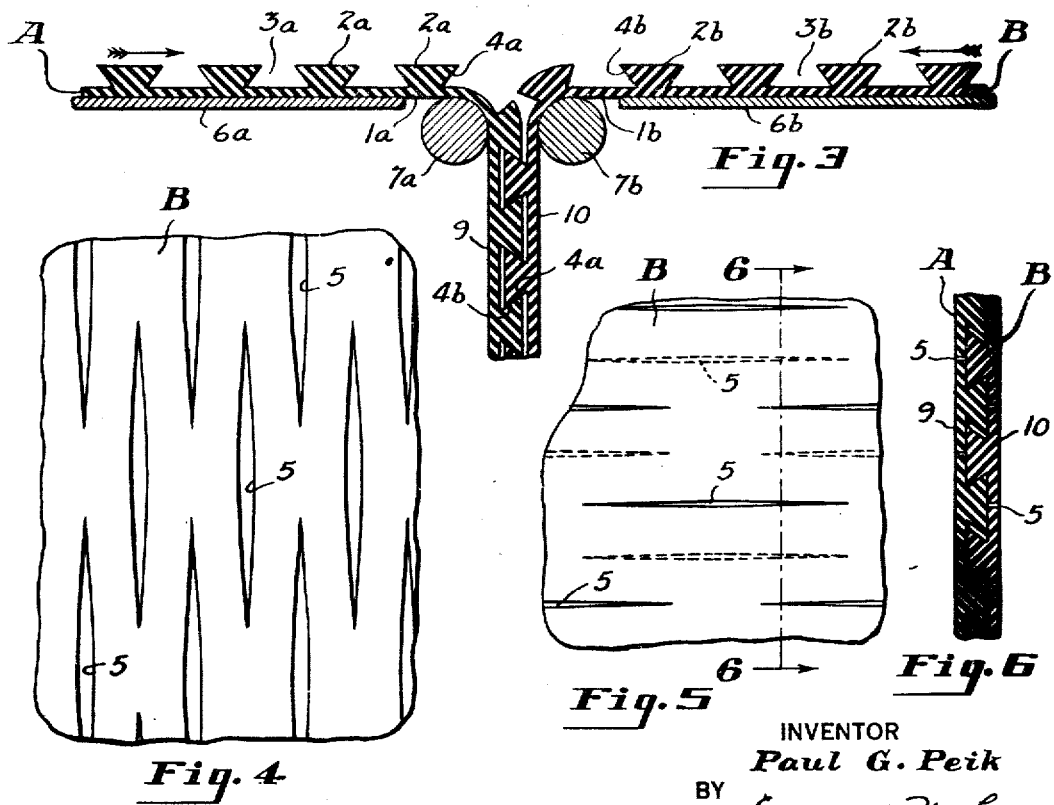
INVENTOR
Paul G. Peik
BY Evans + McCoy
ATTORNEYS

Patented Oct. 9, 1945

2,386,502

UNITED STATES PATENT OFFICE 2,386,502

SOUND DEADENER

Paul G. Peik, Akron, Ohio, assignor to The General Tire & Rubber Company, Akron, Ohio, a corporation of Ohio Application October 15, 1942, Serial No. 462,121

10 Claims. (Cl. 154—44)

This invention relates to a sound deadening material, to a method of making the same, and to a method of dampening the vibrations of panels and the like. It particularly relates to a sound deadening material which may be applied to vertical or horizontal metal members, such, for example, as are present in the air ducts of combat ships, etc.

In my prior application Serial No. 389,489, filed April 21, 1941, now Patent No. 2,337,525, issued December 21, 1943, of which this application is a continuation-in-part, I described a sound deadener for horizontal panels which comprises a sheet of rubber having a plurality of staggered slots or cuts therethrough. As set forth in my prior application, the slots permit the sheeted material or mat to move in an accordion fashion in response to the vibrations of the panel on which it loosely lies. The scrubbing action of the mat on the panel causes absorption of the vibration energy as friction. This was borne out by data which showed that when the sheeted rubber sound deadening material was cemented to the surface of the metal panel, the sound deadening efficiency was no better than that of a solid sheet of rubber, which is substantially nil. While a very thin slotted sheet of rubber described in my above mentioned application is extremely effective in automotive use where most of the noise is transmitted through the floor panels, it is entirely ineffective for vertical panels for the reason that it cannot be cemented to the panels without destroying the sound deadening effect.

It is an object of the present invention to provide a vibration-absorbing material which can be readily applied to vertical panels to reduce vibration thereof.

In the dampening of air ducts and the like, vibration absorbing material must be relatively thin, not over ¼ inch in thickness on combat ships, if it is not to unduly reduce the cross sectional area of the duct and to thereby unduly diminish the air supply, yet it must have a sound level reduction of at least 100 decibels per second.

It is, therefore, another object of the present invention to provide a method of reducing the vibration of vertical panels, such as the air ducts of combat ships, etc., which does not require the use of thick bodies of vibration-absorbing material.

It is another object of the present invention to provide a sound deadening or vibration-absorbing material which may be applied to vertical panels to reduce vibration thereof and which is highly effective in thin sheet form.

It is a further object of the present invention to provide a method of making a sound or vibration-absorbing material which is highly effective in thin sheet form and which may be cemented to vertical surfaces without destroying its effectiveness.

It is a still further object of the present invention to provide a rubberlike smooth resilient vibration or sound absorbing material which is effective in a form having a relatively thin section to reduce the vibration of air ducts and vertical panels.

Other objects will be apparent from the following description of the invention as illustrated by the accompanying drawing, in which:

Figure 1 is an elevational view of a portion of a vertical panel having a portion of a sheet of sound or vibration deadener embodying the present invention applied thereon;

Fig. 2 is a sectional view through the sheet and portion of the panel on the line 2—2 of Fig. 1;

Fig. 3 is a sectional view through a portion of two elementary sheets or sections of rubberlike material, which together make up the deadening material embodying the present invention, illustrating also in section a portion of suitable apparatus for combining the separate sections in interlocking relation;

Fig. 4 is a slightly expanded plan view of the preferred form of my improved sound deadening material with the cuts or slots running longitudinally or transversely of the undercut ribs and illustrating the accordion-like action of the material;

Fig. 5 is a similar view of a modified form of vibration-absorbing material with the slots or cuts parallel to the ribs thereof; and Fig. 6 is a sectional view on the line 6—6 of Fig. 5.

In accordance with the present invention, the vibrating energy is rapidly absorbed from vertical or horizontal panels by relative movement of spaced interlocked frictional members having frictional surfaces of rubberlike material. Part of the interlocked members are suitably fastened to the panel in spaced relation, and another part of the interlocked members are loosely carried in interlocked relation in the spaces between the fastened members, so that when vibration of the panel occurs, vibration of the fastened members will cause relative movement at the high frictional surfaces between the fastened members and the loosely carried members to absorb the vibrating energy.

Referring more particularly to the drawing, in which like parts are indicated by like numerals of reference throughout the several views, my improved vibration-dampening material comprises a sheet-like flexible section A to be fastened to the panel, and a section B which is loosely carried by section A. Coacting frictional surfaces of both sections A and B are of rubberlike material to provide highest capacity for energy absorption. Section A has a sheetlike flexible backing portion or web 1a which preferably has one side with a smooth surface to be cemented to the panel and which carries on the opposite side a plurality of spaced undercut frictional members, such as the undercut ribs 2a. The frictional members 2a are spaced to loosely carry in interlocked relation the undercut frictional members 2b, which are also preferably spaced upon a flexible backing portion or sheetlike web 1b. If the ribs 2b are independent, as when the web 1b is eliminated, the material is still effective as a deadener. The web 1b should preferably have a smooth surface 10 to decrease frictional resistance to air flow when the material is applied to ducts of combat ships and the like.

Section A, consisting of the flexible backing portion or web 1a and the integral undercut members 2a, may be substantially identical with section B, consisting of the undercut members 2b, and the backing portion or web 1b which serves as means for connecting members 2b together. The undercut ribs 2a and 2b may extend the entire length of the respective sheetlike webs 1a and 1b, respectively.

The spaces 3a between the undercut surfaces of the members 2a are slightly larger than the members 2b, and the spaces 3b between the undercut surfaces of members 2b are larger than the members 2a, so that the undercut frictional members 2a and 2b while in interlocked relation are relatively movable to absorb vibration energy by relative movement of the frictional surfaces 4a and 4b. If a plurality of the undercut frictional members 2b are attached together through a sheetlike backing portion, such as sheet 1b, the backing portion or sheet 1b should contain a plurality of staggered openings or cuts or slots 5 which are shown as having a length several times their width, although any staggered openings are effective. The openings should be staggered in a manner which permits accordion-like action or extensibility of the web portion in at least one direction. The accordion-like action facilitates relatively free longitudinal movement of portions of the loosely held undercut frictional members 2b with respect to the frictional members 2a.

While there is no appreciable absorption of energy by movement of the fastened section with respect to the surface of the panel against which it is applied, it has been found that the slotting or cutting of the section A or the backing portion 1a, which is to be cemented or fastened to the panel in like manner to the slotting or cutting of the relatively removable section A or the web 1b, permits the relatively movable frictional members 2a and 2b to adjust themselves in freer relation to each other before cementing and is therefore desirable. The slots or cuts are preferably across and through the ribs 2a and 2b, as shown in Figure 4. However, the slots may be between the ribs with their major axis parallel to the ribs 2a and 2b without any decrease in the efficiency of the material.

In the assembly of the sound deadener of the present invention, portions of sections A and B are brought together with the ribs 2a and 2b disposed in offset relation so that the grooves or spaces 3a are opposite the ribs 2b, etc., and with the backing members sharply bent in opposite directions. Thus, the undercut members 2b are readily fitted into the spaces 3a by bringing each member 2b into the corresponding space 3a when the smooth side of the backing member over the particular space 3a is bent over a path of relatively small curvature. Similarly the frictional fastening member 2a may be readily fitted into the space 3b by bringing each of the members 2a into the particular corresponding space 3b while the backing member 1b over the space 3b is bent over a path of low radius of curvature to spread the ribs.

As shown in Fig. 3, the sections A and B, which may be prepared by any desirable method, as by molding, extruding, etc., in sheet or strip form, are passed from the source, not shown, over the respective aligning plates 6a and 6b and the respective rollers 7a and 7b where portions of the webs over the spaces between the ribs are successively bent over a relatively small radius of curvature. The rollers 7a and 7b are spaced apart so that their edges are separated by a distance substantially equal to the thickness of the composite deadening material. The surfaces of the rollers 7a and 7b are substantially tangent to the planes of aligning plates 6a and 6b, as well as to the smooth surfaces of the composite deadening material.

At least the frictional surfaces 4a and 4b of the members 2a and 2b, respectively, are composed of rubberlike materials, such as a reclaim rubber, a natural rubber, or vulcanizable synthetic rubber. The entire sections A and B are preferably composed of a low grade reclaim rubber stock, which may be of the now abundant type heretofore used for stair treads and the like. The stock used should preferably contain a substantial amount of filling material so that it has high hysteresis loss when the stock in deformed. The preferred rubber stock has a durometer hardness of 50 to 75 and has as much filler as practicable for production. All of the rubber-like material is preferably a low grade reclaim rubber, such as whole tire reclaim. In order to render the material non-inflammable, a material which prevents combustion, such as a considerable amount of carbonate or chlorine compounds (for example, ammonium chloride, rubber chloride, or chlorine-containing salts which are volatile at elevated temperatures) may be incorporated into or used in conjunction with the composition.

In the dampening of vibrations, a smooth surface 9 of the backing portion of one of the sections of the sheetlike dampening material is suitably fastened to the panel, preferably with a cement over the entire surface 9. The dampener preferably covers the entire surface to be sound deadened.

Using a total overall thickness of only ¼", the efficiency of the deadener of the present invention is about .3, or more than a 300 decibel reduction per second, when tested on the apparatus developed by Dr. Geiger, research physicist of the University of Michigan. According to the Geiger method, the sample is placed on a plate 20" x 20" x ¼"

of high carbon steel, which is suspended on supports at four points along the nodal line and has been ground to ring like a bell. The sample is placed on the plate to cover its surface and the plate is struck a definite blow. The sound decay is measured by an oscilloscope and recorded on a moving film. The rating is the time in seconds for sound to decay 95 decibels, or to about .0000178 of its amplitude. A lower rating is obviously thus given to the most effective deadener.

A solid ¼" sheet of rubber similarly tested yields a Geiger rating of about 100 or a reduction of only one decibel per second.

It is to be understood that variations and modifications of the specific product and process herein shown and described for purpose of illustration may be made without departing from the spirit of the invention.

What I claim is:

1. A material for absorbing the vibration from panels and the like, comprising a flexible sheet-like backing portion with a substantially smooth surface to be fastened to the vibratory panel, a plurality of frictional members having undercut surfaces of rubberlike material integrally carried on one side of said backing portion and spaced to provide spaces between undercut sides of adjacent members, and a plurality of frictional members loosely carried in interlocked relation in said spaces between said integral frictional members, said loosely carried frictional members having surfaces of rubberlike material which are adapted to bear against said undercut surfaces, whereby vibration energy may be absorbed by relative movement of surfaces of said loosely carried and said integral members.

2. A deadening material, which is flexible and which is effective in forms having thin section for reducing the vibration of panels, comprising a plurality of spaced, undercut frictional members, a sheetlike flexible web of rubberlike material integrally connecting said frictional members and having a surface to be attached to the panel, said frictional members having undercut surfaces of rubberlike material and being spaced to provide spaces between undercut sides of adjacent members, and a plurality of other frictional members loosely carried in interlocked relation in said spaces between said integral frictional members, said loosely carried frictional members having surfaces of rubberlike material which are adapted to bear against said undercut surfaces of said integral frictional members to dissipate vibration energy by relative frictional movement.

3. A deadening material effective in forms having thin section for reducing the vibration of panels comprising a plurality of spaced, undercut frictional members, a sheetlike flexible web of rubberlike material integrally connecting said frictional members and having a surface to be attached to the panel, said frictional members having undercut surfaces of rubberlike material and being spaced to provide spaces between undercut sides of adjacent members, and a plurality of other frictional members loosely carried in interlocked relation in said spaces between said integral frictional members, said loosely carried frictional members also being connected by a sheetlike flexible web having a plurality of staggered slots so arranged as to permit longitudinal extensibility of said web in accordion-like manner, the surfaces of said loosely carried frictional members which bear against said undercut surfaces being of rubberlike material.

4. A flexible deadening material effective in forms having thin section for reducing the vibration of panels comprising a plurality of spaced, undercut frictional members, a sheetlike flexible web of rubberlike material integrally connecting said frictional members and having a surface to be attached to the panel, said frictional members having undercut surfaces of rubberlike material and being spaced to provide spaces between undercut sides of adjacent members, a plurality of other frictional members loosely carried in interlocked relation in said spaces between said integral frictional members, and flexible means connecting said loosely carried frictional members together, said loosely carried frictional members having surfaces of rubberlike material which are adapted to bear against said undercut surfaces of said integral frictional members to dissipate vibration energy by relative frictional movement.

5. A flexible deadening material effective in forms having thin section for reducing the vibration of panels comprising a plurality of spaced, undercut frictional members, a sheetlike flexible web of rubberlike material integrally connecting said frictional members and having a surface to be attached to the panel, said frictional members having undercut surfaces and being spaced to provide spaces between undercut sides of adjacent members, a plurality of other frictional members loosely carried in interlocked relation in said spaces between said integral frictional members, and flexible means connecting said loosely carried frictional members together, said frictional members being of rubberlike material.

6. A deadening material effective in forms having thin section for reducing the vibration of panels comprising a plurality of spaced, undercut flexible ribs, a sheetlike flexible web of rubberlike material integrally connecting said ribs and having a surface to be attached to the panel, said ribs having undercut surfaces of rubberlike material and being spaced to provide spaces between undercut sides of adjacent ribs, and a plurality of other ribs loosely carried in interlocked relation in said spaces between said integral ribs, said loosely carried ribs having surfaces of rubberlike material which are adapted to bear against said undercut surfaces of said integral ribs to dissipate vibration energy by relative frictional movement.

7. A deadening material effective in forms having thin section for reducing the vibration of panels comprising a plurality of spaced, undercut ribs, a sheetlike flexible web of rubberlike material integrally connecting said ribs and having a surface to be attached to the panel, said ribs having undercut surfaces of rubberlike material and being spaced to provide spaces between undercut sides of adjacent ribs, and a plurality of other ribs loosely carried in interlocked relation in said spaces between said integral ribs, said loosely carried ribs also being connected by a sheetlike flexible web having a plurality of staggered slots therethrough to permit longitudinal extensibility of said web in accordion-like manner, the surfaces of said loosely carried ribs which bear against said undercut surfaces being of rubberlike material.

8. A deadening material effective in forms having thin section for reducing the vibration of panels comprising a plurality of spaced, undercut ribs, a sheetlike flexible web of rubberlike material integrally connecting said ribs and having a surface to be attached to the panel, said ribs having undercut surfaces of rubberlike material and being spaced to provide spaces between undercut sides of adjacent ribs, and a plurality of other ribs loosely carried in interlocked relation in said spaces between said integral ribs, said loosely carried ribs also being connected by a sheetlike flexible web having a plurality of staggered slots parallel to said ribs, whereby to permit longitudinal extensibility of said web in accordion-like manner is had, the surfaces of said loosely carried ribs which bear against said undercut surfaces being of rubberlike material.

9. A deadening material effective in forms having thin section for reducing the vibration of panels comprising a plurality of spaced, undercut ribs, a sheetlike flexible web of rubberlike material integrally connecting said ribs and having a surface to be attached to the panel, said ribs having undercut surfaces of rubberlike material and being spaced to provide spaces between undercut sides of adjacent ribs, and a plurality of other ribs loosely carried in interlocked relation in said spaces between said integral ribs, said loosely carried ribs also being connected by a sheetlike flexible web having a plurality of staggered slots across and through some of said ribs, whereby to permit longitudinal extensibility of said web in accordion-like manner is had, the surfaces of said loosely carried ribs which bear against said undercut surfaces being of rubberlike material.

10. A deadening material effective in forms having thin section for reducing the vibration of panels comprising a plurality of spaced, undercut ribs, a sheetlike flexible web of rubberlike material integrally connecting said ribs and having a surface to be attached to the panel, said ribs having undercut surfaces of rubberlike material and being spaced to provide spaces between undercut sides of adjacent ribs, and a plurality of other ribs loosely carried in interlocked relation in said spaces between said integral ribs, said loosely carried ribs also being connected by a sheetlike flexible web, said webs having a plurality of spaced and staggered slots with a major axis across the ribs to permit longitudinal extensibility of said webs in accordion-like manner.

PAUL G. PEIK.

CERTIFICATE OF CORRECTION.

Patent No. 2,386,502.  October 9, 1945.

PAUL G. PEIK.

It is hereby certified that error appears in the printed specification of the above numbered patent requiring correction as follows: Page 3, second column, lines 72 and 73, claim 8, and page 4, first column, line 16, claim 9, strike out the words "to permit"; and that the said Letters Patent should be read with this correction therein that the same may conform to the record of the case in the Patent Office.

Signed and sealed this 12th day of February, A. D. 1946.

Leslie Frazer (Seal)  First Assistant Commissioner of Patents.

9. A deadening material effective in forms having thin section for reducing the vibration of panels comprising a plurality of spaced, undercut ribs, a sheetlike flexible web of rubberlike material integrally connecting said ribs and having a surface to be attached to the panel, said ribs having undercut surfaces of rubberlike material and being spaced to provide spaces between undercut sides of adjacent ribs, and a plurality of other ribs loosely carried in interlocked relation in said spaces between said integral ribs, said loosely carried ribs also being connected by a sheetlike flexible web having a plurality of staggered slots across and through some of said ribs, whereby to permit longitudinal extensibility of said web in accordion-like manner is had, the surfaces of said loosely carried ribs which bear against said undercut surfaces being of rubberlike material.

10. A deadening material effective in forms having thin section for reducing the vibration of panels comprising a plurality of spaced, undercut ribs, a sheetlike flexible web of rubberlike material integrally connecting said ribs and having a surface to be attached to the panel, said ribs having undercut surfaces of rubberlike material and being spaced to provide spaces between undercut sides of adjacent ribs, and a plurality of other ribs loosely carried in interlocked relation in said spaces between said integral ribs, said loosely carried ribs also being connected by a sheetlike flexible web, said webs having a plurality of spaced and staggered slots with a major axis across the ribs to permit longitudinal extensibility of said webs in accordion-like manner.

PAUL G. PEIK.

CERTIFICATE OF CORRECTION.

Patent No. 2,386,502.  October 9, 1945.

PAUL G. PEIK.

It is hereby certified that error appears in the printed specification of the above numbered patent requiring correction as follows: Page 3, second column, lines 72 and 73, claim 8, and page 4, first column, line 16, claim 9, strike out the words "to permit"; and that the said Letters Patent should be read with this correction therein that the same may conform to the record of the case in the Patent Office.

Signed and sealed this 12th day of February, A. D. 1946.

Leslie Frazer (Seal)  First Assistant Commissioner of Patents.